United States Patent [19]
Ochi et al.

[11] Patent Number: 5,630,376
[45] Date of Patent: May 20, 1997

[54] ABSORBENT COMPOSITE PANEL FOR PET ANIMAL

[75] Inventors: Kengo Ochi, Kawanoe; Yuko Kawasaki, Kanonji, both of Japan

[73] Assignee: Uni-Charm Corporation, Ehime-ken, Japan

[21] Appl. No.: 517,031

[22] Filed: Aug. 18, 1995

[30] Foreign Application Priority Data

Aug. 23, 1994 [JP] Japan .................. 6-198629

[51] Int. Cl.$^6$ .................................... A01K 1/015
[52] U.S. Cl. ........................... 119/169; 604/385.2
[58] Field of Search ........................ 119/169, 165, 119/171, 172, 850; 604/385.1, 385.2

[56] References Cited

U.S. PATENT DOCUMENTS 4,913,954  4/1990  Mack ........................... 428/213
4,961,930  10/1990  Perdelwitz, Jr. et al. .......... 428/411

FOREIGN PATENT DOCUMENTS 0359478  3/1990  European Pat. Off. .
2748348  5/1979  Germany .
2187927  9/1987  United Kingdom .

*Primary Examiner*—Robert P. Swiatek
*Assistant Examiner*—Yvonne R. Abbott
*Attorney, Agent, or Firm*—Lowe, Price, LeBlanc & Becker

[57] ABSTRACT

An absorbent composite panel comprising a liquid-absorbent panel and a liquid-impermeable backsheet, wherein the top surface of the absorbent panel is partially covered along its peripheral edges with a liquid-impermeable overflow barrier strips which are then bonded integrally to the backsheet along their outer side edges and each inner side edge of the overflow barrier strips is spaced by each spacer from the top surface of the absorbent panel by a desired distance.

5 Claims, 4 Drawing Sheets

ABSORBENT COMPOSITE PANEL FOR PET ANIMAL

BACKGROUND OF THE INVENTION

The present invention relates to an absorbent composite panel for pet animals and, more particularly, to such a panel to be laid on a urination or evacuation tray and the like used to breed pet animals such as cats, dogs or hamsters.

Conventional absorbent composite panel for pet animals composite comprises a liquid-absorbent panel disposed between a liquid-permeable sheet and a liquid-impermeable sheet with these two sheets being bonded together along their portion extending outward beyond the peripheral edge of the liquid-absorbent panel.

However, such known absorbent panels have been accompanied with a problem that, if urination occurs in the proximity of the peripheral edge of the composite panel, a quantity of urine will readily overflow beyond the peripheral edges, smearing the place around the composite panel, and use of the composite panel will be practically meaningless.

Accordingly, it is a principal object of the invention to solve such a problem by partially covering the top surface of the composite panel along its peripheral edges with a liquid-impermeable overflow barrier strips.

SUMMARY OF THE INVENTION

The object set forth above is achieved, according to the invention, by an improved absorbent composite panel for pet animal comprising a liquid-absorbent panel and a liquid-impermeable backsheet entirely covering the bottom surface of the liquid-absorbent panel, wherein the top surface of the liquid-absorbent panel is partially covered along its peripheral edges with each liquid-impermeable overflow barrier strip which is then bonded integrally to the backsheet along their outer side edges so as to water-tightly seal the peripheral edges of the absorbent panel and there is provided between each inner side edge of the overflow barrier strips and the top surface of the absorbent panel, spacer means being able to space each inner side edge of the overflow barrier strips upward from the top surface of the absorbent panel by a desired distance.

Preferably, each inner side edge of the overflow barrier strips cooperates with the top surface of the absorbent panel to define each pocket adapted to be opened inwardly of the absorbent composite panel. Alternatively, the overflow barrier strips are preferably defined by folding portions of the backsheet extending outward beyond the peripheral edges of the absorbent panel back onto the top surface of the absorbent panel. According to still another embodiment of the invention, the spacer means are defined by folding the peripheral edges of the absorbent panel back onto the top surface of the absorbent panel itself. According to further another embodiment, the top surface of the absorbent panel is entirely covered with a liquid-permeable sheet, portions of the liquid-permeable sheet extending outward beyond the peripheral edges of the absorbent panel are folded back toward the top surface of the absorbent panel, and these folded portions are folded back toward the top surface of the absorbent panel to define the spacer means.

With the absorbent composite panel of the invention, the peripheral edges of the composite panel are covered with the overflow barrier strips having their inner side edges spaced upward by the spacer means from the top surface of the absorbent panel by a desired distance so that the overflow barrier strips function as an effective dam preventing a quantity of urine from overflowing beyond the peripheral edges of the composite panel.

With the arrangement such that each inner side edge of the overflow barrier strips defines each pocket adapted to be opened inwardly of the composite panel, these pocket can hold a large quantity of urine discharged at once and prevent this from overflowing beyond the peripheral edges of the composite panel.

PREFERRED EMBODIMENTS OF THE INVENTION

Details of an absorbent composite panel according to the invention will be more specifically understood from the following description of presently preferred embodiments made in reference with the accompanying drawings.

Figure 1:
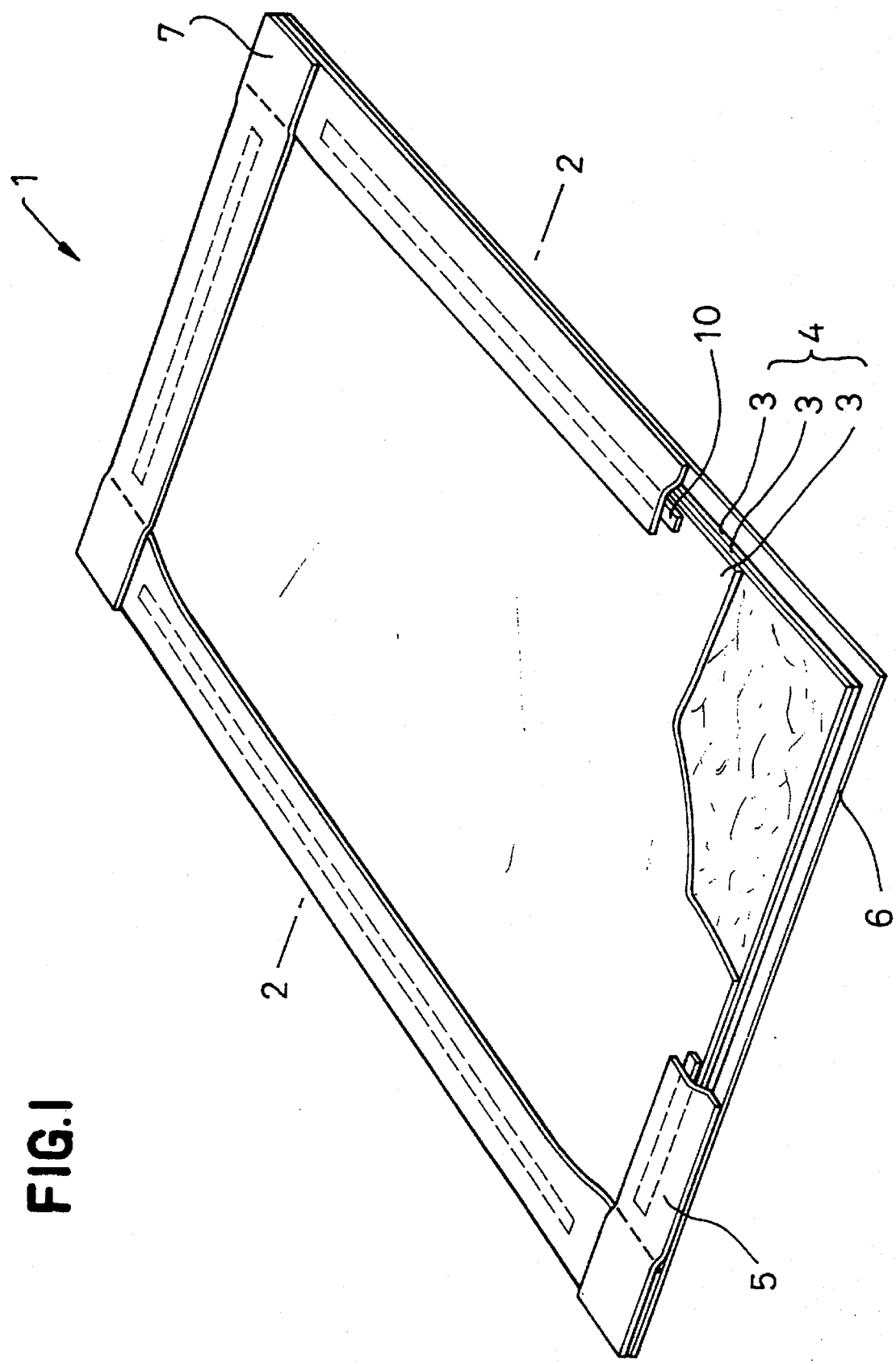
FIG. 1 is a perspective view of an absorbent composite panel as partially broken away.
Figure 2:
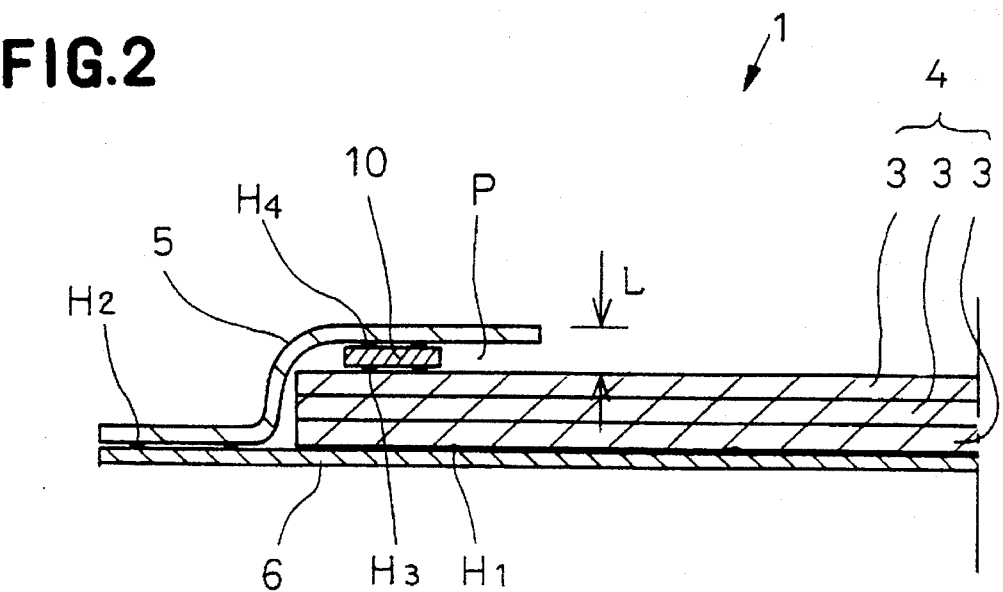
FIG. 2 is a sectional view taken along a line 2—2 in FIG. 1.

Referring to FIGS. 1 and 2, a composite panel 1 comprises a liquid-absorbent panel 4 which comprises, in turn, a plurality of rectangular liquid-absorbent component panels 3 laminated and bonded together, liquid-impermeable overflow strips 5 bonded to and covering the top surface of the absorbent panel 4 along its peripheral edges, and a liquid-impermeable backsheet 6 entirely covering the bottom surface of the absorbent panel 4. The overflow barrier strips 5 are overlapped and firmly bonded one to another at four corners 7 of the composite panel 1 while the backsheet 6 is intermittently bonded with hot melt type adhesive $H_1$ to the bottom surface of the absorbent panel 4 so that they can not be displaced relatively to each other. The overflow barrier strips 5 and the backsheet 6 have their outer side edges extending outward beyond the peripheral edges of the absorbent panel 4 are water-tightly bonded to each other with hot melt type adhesive $H_2$. Each spacer 10 is disposed between each inner side edge of the overflow barrier strips 5 and the top surface of the absorbent panel 4 so that each inner side edge of the overflow barrier strips 5 may be spaced upward from the top surface of the absorbent panel 4 by a desired distance "L" so as to form each pocket "P" being openable inwardly of the composite panel 1. Each spacer 10 extends along each side edge of the absorbent panel 4 and is bonded to the absorbent panel 4 and/or each overflow barrier strip 5 with hot melt type adhesive $H_3$ and $H_4$, respectively. If each spacer 10 is provided closely adjacent each inner side edge of the overflow barrier strips 5, a depth of each pocket "P" will be correspondingly decreased or even substantially eliminated. Nevertheless, each spacer 10 will form a dam of the height "L" against overflow regardless of a position at which each spacer 10 is positioned relative to each inner side edge of the overflow barrier strips 5. Each spacer 10 may have a length dimensioned to be substantially equal to or smaller than the length of each edge of the absorbent panel 4.

For the composite panel constructed as described above, the liquid-absorbent sheet 3 may be made of material such as rayon paper, nonwoven fabric of hydrophilic fibers, pulp fibers or a mixture sheet of pulp fibers and highly water absorptive polymer powders; the overflow barrier strip 5 may be made of plastic film or nonwoven fabric of hydrophobic synthetic fibers; and the backsheet 6 is preferably made of plastic film. There is no limitation imposed on material for the spacers 10 and it is also possible to form the spacer 10, for example, from cellular material such as urethane sponge, nonwoven fabric, paper, rubber sheet or plastic sheet. For bonding of the respective members, adhesive hot melt type or the other types, or tackifier may be used and, for the thermally fusible members, a welding technique may be employed.

Figure 3:
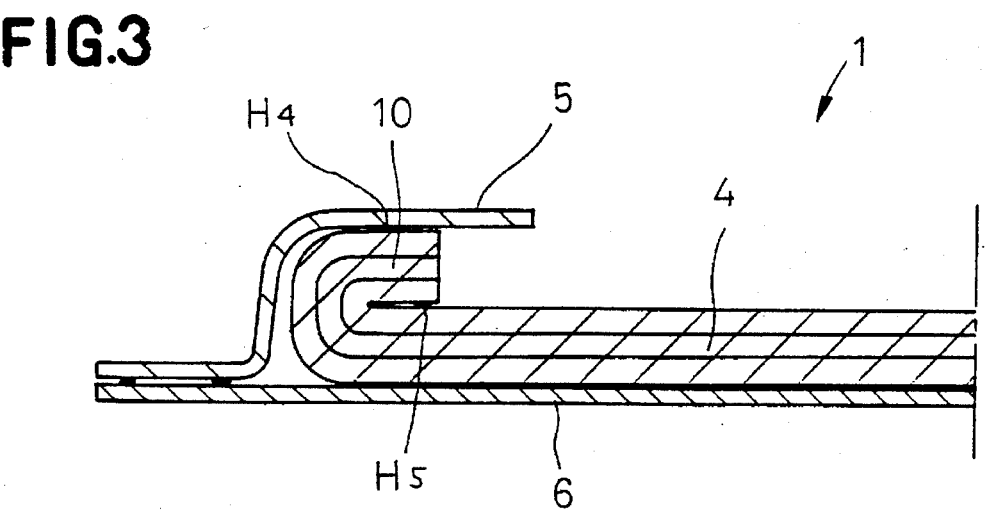
FIG. 3 is a view similar to FIG. 2 showing a variant of the composite panel.

Referring to FIG. 3, each edge of the absorbent panel 4 is folded back onto the top surface of the absorbent panel 4 and bonded thereto with hot melt type adhesive $H_5$ so that these folded portions may function as the spacers 10. The remainder of the arrangement is similar to that of the embodiment shown by FIG. 2.

Figure 8:
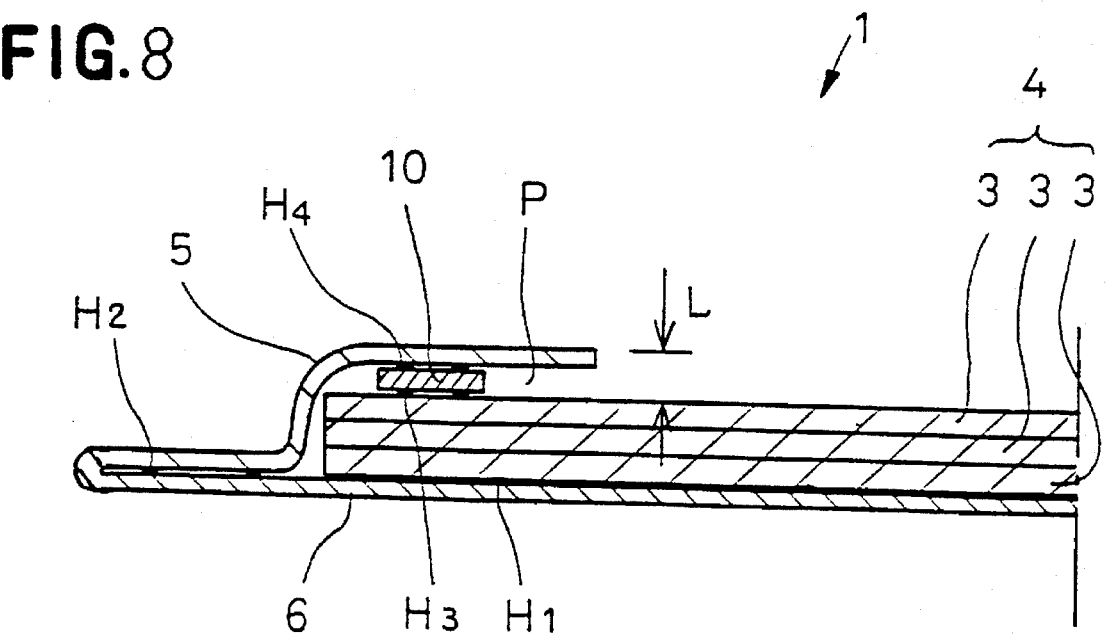
FIG. 8 is a view similar to FIG. 2 showing another variant of the composite.

Referring to FIG. 8, each edge of the backsheet 6 extending outward beyond the side edges of the absorbent panel 4 is folded back onto the top surface of the absorbent panel 4 and is bonded either to the absorbent panel 4 or to a spacer 10. The remainder of the arrangement is similar to that of the embodiment shown by FIG. 2.

Figure 4:
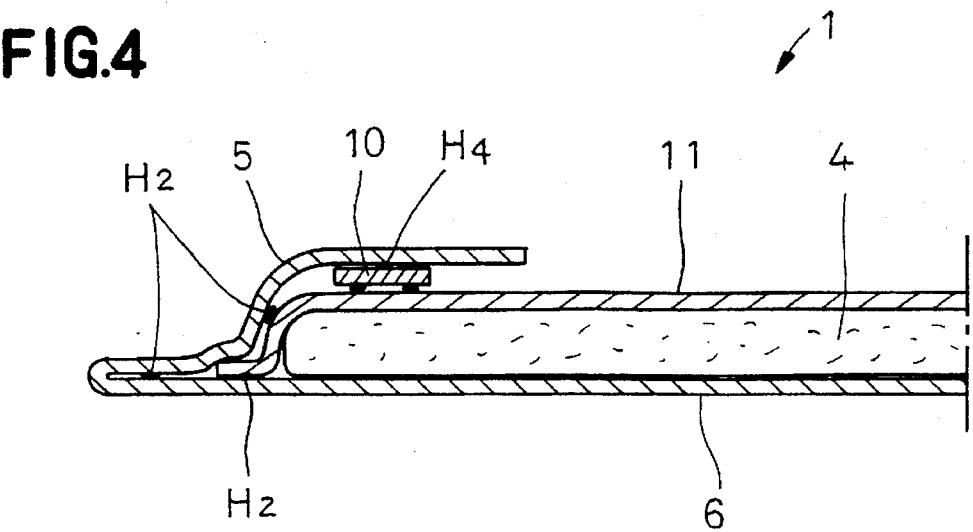
FIG. 4 is a view similar to FIG. 2 showing another variant of the composite panel.

Referring to FIG. 4, the top surface of the absorbent panel 4 is entirely covered with a liquid-permeable sheet 11 and portions of this liquid-permeable sheet 11 extending outward beyond the peripheral edges of the absorbent panel 4 is bonded with hot melt type adhesive $H_2$ to portions of the backsheet 6 also extending outward beyond the peripheral edges of the absorbent panel 4. Then, portions of the backsheet 6 extending outward beyond the associated side edges of the liquid-permeable sheet 11 and preferably bonded with hold melt type adhesive $H_4$ to the spacers 10 so as to define the overflow barrier strips 5. The folded portions of the backsheet 6 may be bonded to the non-folded portions of the backsheet 6 and/or to the liquid-permeable sheet 11 to keep it in the folded state. The liquid-permeable sheet 11 may be made of material such as meshy cloth, nonwoven fabric or perforated plastic film and the presence of this liquid-permeable sheet 11 allows the absorbent panel 4 to be kept in the form of the panel even when the absorbent panel 4 is made of fine fibers such as fluff pulp, or granular or powdery material such as highly water absorptive polymer powders and thereby allows the material of the absorbent panel 4 to be prevented from being scattered. The sheet 11 and the panel 4 are intermittently bonded to each other with hot melt type adhesive.

Figure 5:
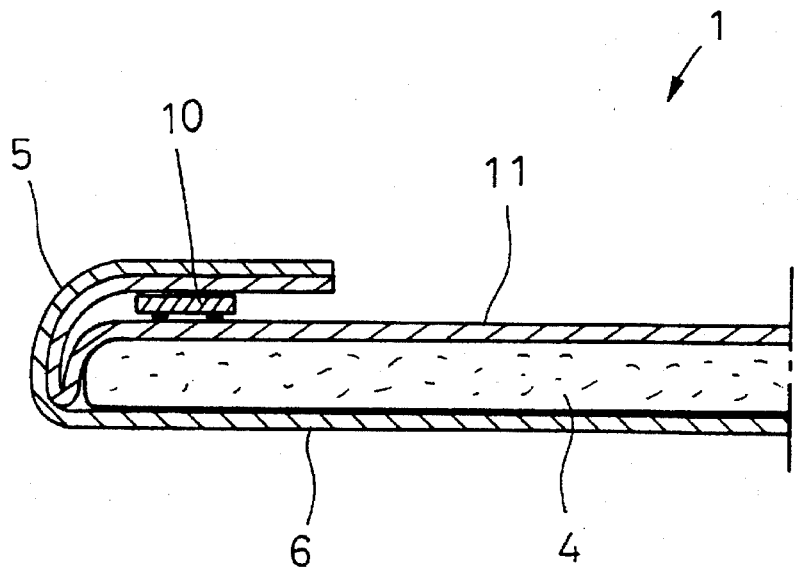
FIG. 5 is a view similar to FIG. 2 showing still another variant of the composite panel.

Referring to FIG. 5, the backsheet 6 and the liquid-permeable sheet 11 of substantially same dimensions are bonded to each other along their portions extending outward beyond the peripheral edges of the absorbent panel 4, then folded together back toward the top surface of the absorbent panel 4 and bonded to the spacers 10 so that these folded portions may define the overflow barrier strips 5. Alternatively, the folded portions may be bonded to the surface of the liquid-permeable sheet 11 opposed thereto, instead of being bonded to the spacer 10.

Figure 6:
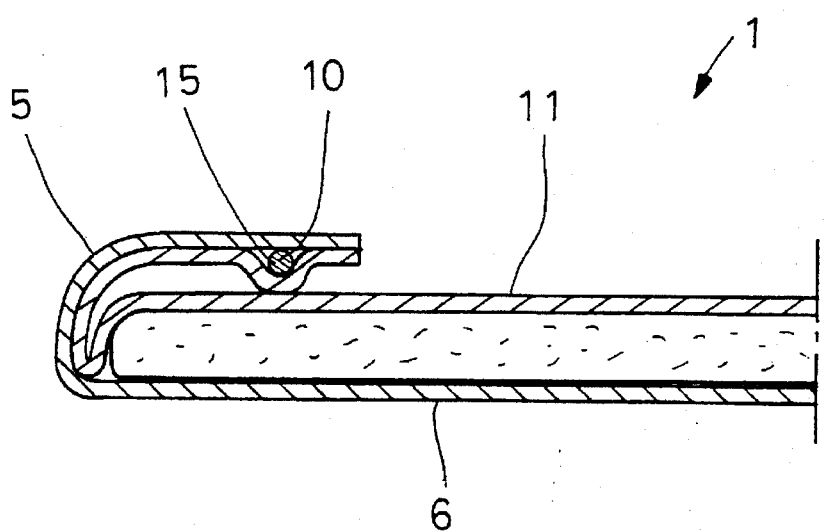
FIG. 6 is a view similar to FIG. 2 showing further variant of the composite panel.

Referring to FIG. 6, the spacers 10 are formed by elastics or inelastic ribbons 15 disposed between the backsheet 6 and the liquid-permeable sheet 11. When the elastic ribbons 15 are used, they may be bonded with a tension to the backsheet 6 or to the liquid-permeable sheet 11.

Figure 7:
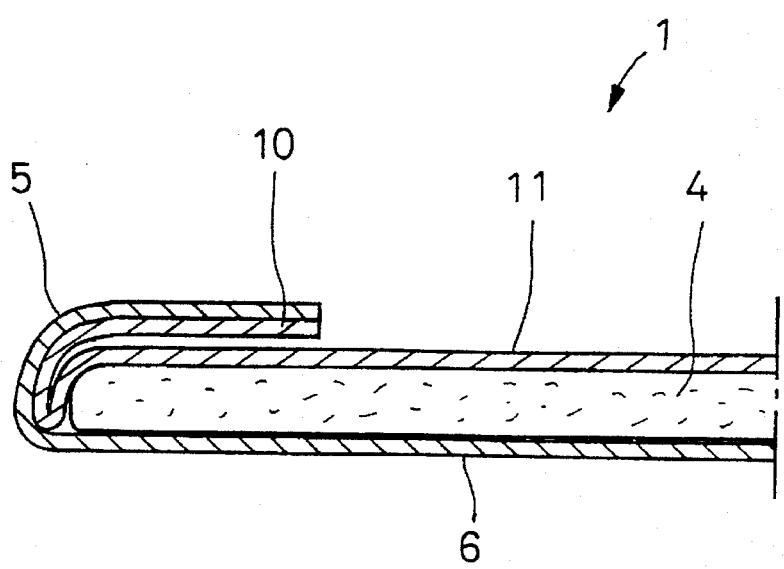
FIG. 7 is a view similar to FIG. 2 showing further another variant of the composite panel.

Referring to FIG. 7, the folded portions of the liquid-permeable sheet 11 define the spacers 10. This specific variant of the composite panel 1 is useful particularly when the distance "L" by which the overflow barrier strips 5 must be spaced from the top surface of the absorbent panel 4 is relatively small and/or the liquid-permeable sheet 11 is relatively thick. The overflow barrier strips 5 may be bonded to the surface of the liquid-permeable sheet 11 opposed thereto.

Though not shown, the variant of FIG. 7 may be modified so that the inner side edges of the overflow barrier strips 5 and/or the liquid-permeable sheet 11 may be folded or rolled back toward the liquid-permeable sheet 11 to define the spacers 10.

While the composite panel 1 has been described hereinabove as being of rectangular shape, it should be understood that the plane shape is not limited to such rectangular shape.

It is possible for the composite panel of the invention to prevent a quantity of urine from overflowing even when urination occurs on the composite panel in the proximity of its peripheral edges, since the top surface of the absorbent panel is covered along its peripheral edges with the overflow barrier strips and the inner side edges of the overflow barrier strips are spaced from the top surface of the absorbent panel by a desired distance so as to define the overflow dam.

What is claimed is:

1. An absorbent composite panel for pet animal waste comprising:

an absorbent panel having peripheral edges;

a liquid-impermeable backsheet covering the bottom surface of said absorbent panel;

a plurality of liquid-impermeable overflow barrier strips, each one of said plurality of barrier strips being disposed along one of the peripheral edges and bonded integrally to said backsheet along an outer side edge thereof to provide a water-tight seal along the peripheral edges of said absorbent panel; and spacer means disposed between an inner side edge of each of the plurality of barrier strips and the top surface of said absorbent panel and attached to said panel for spacing each inner side edge of said overflow strips upward from the top surface of said absorbent panel by a desired distance.

2. An absorbent composite panel according to claim 1, wherein each inner side edge of the overflow barrier strips cooperates with the top surface of said absorbent panel to define a pocket adapted to be opened inwardly of said composite panel.

3. An absorbent composite panel for pet animal waste comprising:

an absorbent panel having peripheral edges;

a liquid-impermeable backsheet covering the bottom surface of said absorbent panel;

a plurality of liquid-impermeable overflow barrier strips, each one of said plurality of barrier strips being disposed along one of the peripheral edges of said absorbent panel and formed by folding portions of said backsheet extending outward beyond the peripheral edges of said absorbent panel back onto the top surface of said absorbent panel to provide a water-tight seal along the peripheral edges of said absorbent panel; and spacer means disposed between an inner side edge of each of the plurality of barrier strips and the top surface of said absorbent panel for spacing each inner side edge of said overflow strips upward from the top surface of said absorbent panel by a desired distance.

4. An absorbent composite panel for pet animal waste comprising:

an absorbent panel having peripheral edges;

a liquid-impermeable backsheet covering the bottom surface of said absorbent panel;

a plurality of liquid-impermeable overflow barrier strips, each one of said plurality of barrier strips being disposed along one of the peripheral edges and bonded integrally to said backsheet along an outer side edge thereof to provide a water-tight seal along the peripheral edges of said absorbent panel;

a plurality of spacers formed by folding the peripheral edges of said absorbent panel back onto the top surface of said absorbent panel;

wherein each of said spacers are disposed between an inner side edge of each of the plurality of barrier strips and the top surface of said absorbent panel for spacing each inner side edge of said overflow strips upward from the top surface of said absorbent panel by a desired distance.

5. An absorbent composite panel for pet animal waste comprising:

an absorbent panel having peripheral edges;

a liquid-impermeable backsheet covering the bottom surface of said absorbent panel;

a liquid-permeable topsheet covering the top surface of said absorbent panel;

a plurality of liquid-impermeable overflow barrier strips, each one of said plurality of barrier strips being disposed along one of the peripheral edges and bonded integrally to said backsheet along an outer side edge thereof to provide a water-tight seal along the peripheral edges of said absorbent panel;

a plurality of spacers formed when portions of said liquid-permeable topsheet extending outward beyond the peripheral edges of said absorbent panel are folded back towards the top surface of said absorbent panel;

wherein each of said spacers are disposed between an inner side edge of each of the plurality of barrier strips and the top surface of said absorbent panel for spacing each inner side edge of said overflow strips upward from the top surface of said absorbent panel by a desired distance.

* * * * *